(12) United States Patent
Kawanabe et al.

(10) Patent No.: US 11,831,813 B2
(45) Date of Patent: Nov. 28, 2023

(54) APPARATUS, SYSTEM, AND METHOD FOR CONTROLLING APPARATUS

(71) Applicant: CANON KABUSHIKI KAISHA, Tokyo (JP)

(72) Inventors: Jun Kawanabe, Saitama (JP); Ryosuke Miura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 17/535,150

(22) Filed: Nov. 24, 2021

(65) Prior Publication Data

US 2022/0174227 A1  Jun. 2, 2022

(30) Foreign Application Priority Data

Nov. 30, 2020  (JP) .................. 2020-198286

(51) Int. Cl.
*H04N 5/32* (2023.01)
*G01T 1/20* (2006.01)

(52) U.S. Cl.
CPC ............. *H04N 5/32* (2013.01); *G01T 1/2018* (2013.01)

(58) Field of Classification Search
None
See application file for complete search history.

(56) References Cited

U.S. PATENT DOCUMENTS

2014/0361189 A1* 12/2014 Kameshima ......... H04N 25/745
  250/394
2019/0094394 A1*  3/2019 Matsumoto ......... H04N 25/616

FOREIGN PATENT DOCUMENTS

JP      2020089714 A     6/2020

* cited by examiner

*Primary Examiner* — Edwin C Gunberg
(74) *Attorney, Agent, or Firm* — CANON U.S.A., INC. IP Division

(57) ABSTRACT

In a period between an operation for acquiring signals for an image via an amplification unit and an operation for acquiring offset signals for correcting the image via the amplification unit, a current supply capability of the amplification unit is made equal to a current supply capability in a period immediately before the image is acquired, thereby the potential state of a signal line when the signals for the image are acquired and the potential state when the offset signals for correcting the image are acquired are matched, and an artifact when the correction is made is reduced.

19 Claims, 12 Drawing Sheets

APPARATUS, SYSTEM, AND METHOD FOR CONTROLLING APPARATUS

BACKGROUND

Field of the Disclosure

The aspect of the embodiments relates to a radiographic imaging apparatus, a radiographic imaging system, and a method for controlling a radiographic imaging apparatus.

Description of the Related Art

A radiographic imaging apparatus having an automatic exposure control (AEC) function is known. Such a radiographic imaging apparatus can measure the amount of radiation that is being emitted and end the emission of radiation based on a result of the measurement. For example, the radiographic imaging apparatus drives only pixels set for detecting radiation at high speed during the emission of radiation, thereby monitoring the amount of radiation. Japanese Patent Application Laid-Open No. 2020-89714 discusses a method for acquiring offset signals of pixels for detecting radiation by the time a request to start emitting radiation is received.

Japanese Patent Application Laid-Open No. 2020-89714, however, does not discuss handling of a case where the request to start emitting radiation is made during the acquisition of offset signals of pixels for detecting radiation. If the request to start emitting radiation is made during the acquisition of offset signals of pixels for detecting radiation, an image artifact may occur and the grade of an image may decrease depending on a driving mode of a reading circuit.

SUMMARY OF THE DISCLOSURE

According to an aspect of the embodiments, an apparatus includes a plurality of pixels including a detection pixel configured to perform a detection operation for detecting an amount of emission of emitted radiation, a correction pixel having a sensitivity to radiation lower than a sensitivity of the detection pixel to radiation and configured to correct the amount of emission in the detection operation, and an imaging pixel configured to acquire a radiographic image, and an amplification unit including a calculation amplifier including a feedback circuit configured to amplify signals read from the plurality of pixels via a signal line, the calculation amplifier including an output unit having a current supply capability being variable, wherein, in response to reception of an instruction, the apparatus performs the detection operation by reading charges from the detection pixel and the correction pixel in a state where radiation is emitted and performs an image acquisition operation for reading a charge based on radiation accumulated in the imaging pixel, and then, the apparatus performs an offset signal acquisition operation for reading a charge accumulated in the imaging pixel in a state where radiation is not emitted, and performs a correction value acquisition operation for acquiring a correction value to be used in the detection operation before performing the image acquisition operation, and wherein, in a case where the apparatus receives the instruction during the correction value acquisition operation, the apparatus causes the amplification unit to operate between the image acquisition operation and the offset signal acquisition operation based on a current supply capability in the correction value acquisition operation.

Further features of the disclosure will become apparent from the following description of exemplary embodiments with reference to the attached drawings.

DESCRIPTION OF THE EMBODIMENTS

Exemplary embodiments of the disclosure will be described below with reference to the attached drawings. Components similar throughout various exemplary embodiments are designated by the same reference signs, and are not redundantly described. The exemplary embodiments can be appropriately changed and combined together.

Figure 1:
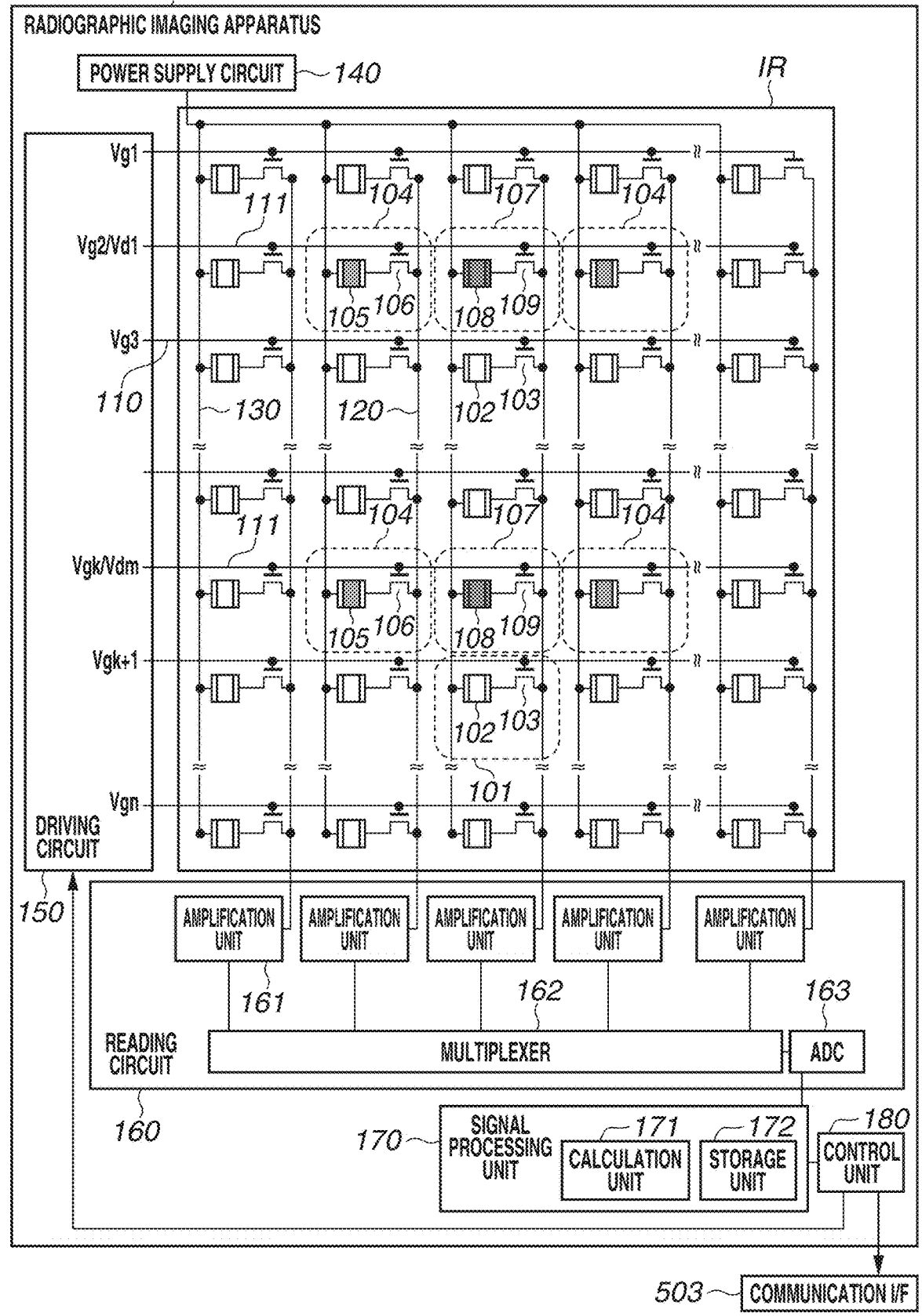
FIG. 1 is a diagram illustrating a configuration of a radiographic imaging apparatus according to a first exemplary embodiment of the disclosure.

FIG. 1 illustrates an example of a configuration of a radiographic imaging apparatus 100 according to a first exemplary embodiment of the disclosure. The radiographic imaging apparatus 100 includes a plurality of pixels arranged in an imaging region IR to form a plurality of rows and a plurality of columns, a plurality of driving lines 110, and a plurality of signal lines 120. The plurality of driving lines 110 is placed corresponding to the plurality of rows of the pixels, and each driving line 110 corresponds to any one of the rows of the pixels. The plurality of signal lines 120 is placed corresponding to the plurality of columns of the pixels, and each signal line 120 corresponds to any one of the columns of the pixels.

The plurality of pixels includes a plurality of imaging pixels 101 used to acquire a radiographic image, one or more detection pixels 104 used to monitor the amount of emission of radiation, and one or more correction pixels 107 used to correct the amount of emission of radiation. A sensitivity of each correction pixel 107 to radiation is lower than a sensitivity of each detection pixel 104 to radiation.

Each imaging pixel 101 includes a conversion element 102 that converts radiation into an electric signal, and a switch element 103 that connects the corresponding signal line 120 and the conversion element 102 to each other.

Each detection pixel 104 includes a conversion element 105 that converts radiation into an electric signal, and a switch element 106 that connects the corresponding signal line 120 and the conversion element 105 to each other. The detection pixel 104 is placed to be included in rows and columns formed of the plurality of imaging pixels 101.

Each correction pixel 107 includes a conversion element 108 that converts radiation into an electric signal, and a switch element 109 that connects the signal line 120 and the conversion element 108 to each other. The correction pixel 107 is placed to be included in the rows and columns composed of the plurality of imaging pixels 101. In FIG. 1 and subsequent figures, the imaging pixels 101, the detection pixels 104, and the correction pixel 107 are distinguished from each other by differently hatching conversion elements 102, conversion elements 105, and conversion elements 108.

Each of the conversion elements 102, the conversion elements 105, and the conversion elements 108 may be composed of a scintillator that converts radiation into light, and a photoelectric conversion element that converts the light into an electric signal. Generally, the scintillator is formed into a sheet-like shape to cover the imaging region IR and shared by a plurality of pixels. Alternatively, each of the conversion elements 102, the conversion elements 105, and the conversion elements 108 may be composed of a conversion element that directly converts radiation into an electric signal.

The switch element 103, the switch element 106, and the switch element 109 may each include a thin-film transistor (TFT) in which an active region is composed of a semiconductor such as amorphous silicon or polycrystalline silicon.

A first electrode of the conversion element 102 is connected to a first main electrode of the switch element 103, and a second electrode of the conversion element 102 is connected to a bias line 130. The bias line 130 extends in the column direction and is commonly connected to second electrodes of a plurality of conversion elements 102 arranged in the column direction. The bias line 130 receives a bias voltage Vs from a power supply circuit 140. Second main electrodes of switch elements 103 of one or more imaging pixels 101 included in one column are connected to the single signal line 120. Control electrodes of the switch elements 103 of one or more imaging pixels 101 included in one row are connected to the single driving line 110.

Each of the detection pixels 104 and the correction pixels 107 has a pixel configuration similar to that of the imaging pixel 101 and is connected to the corresponding driving line 110 and the corresponding signal line 120. The detection pixels 104 and the correction pixels 107 are exclusively connected to the signal lines 120. More specifically, the correction pixels 107 are not connected to the signal lines 120 to which the detection pixels 104 are connected. The detection pixels 104 are not connected to the signal lines 120 to which the correction pixels 107 are connected. The imaging pixels 101 may be connected to the same signal lines 120 to which the detection pixels 104 or the correction pixels 107 are connected.

A driving circuit 150 is configured to supply driving signals to driving target pixels via the plurality of driving lines 110 based on control signals from a control unit 180. In the present exemplary embodiment, the driving signals are signals for turning on the switch elements included in the driving target pixels.

The switch element of each pixel is turned on by a high level signal and turned off by a low level signal. Thus, the high level signal is referred to as the driving signal. The driving signal is supplied to a pixel, whereby signals accumulated in the conversion element of the pixel can be read by a reading circuit 160. In a case where the driving line 110 is connected to at least one of the detection pixel 104 and the correction pixel 107, the driving line 110 is referred to as a detection driving line 111.

The reading circuit 160 is configured to read signals from the plurality of pixels via the plurality of signal lines 120. The reading circuit 160 includes a plurality of amplification units 161, a multiplexer 162, and an analog-to-digital converter (hereinafter, AD converter) 163.

Each of the plurality of signal lines 120 is connected to a corresponding amplification unit 161 among the plurality of amplification units 161 of the reading circuit 160. The single signal line 120 corresponds to the single amplification unit 161.

The multiplexer 162 selects from the plurality of amplification units 161 in a predetermined order and supplies signals from the selected amplification unit 161 to the AD converter 163. The AD converter 163 converts the supplied signals into digital signals and outputs the digital signals.

Signals read from the imaging pixels 101 are supplied to a signal processing unit 170 and subjected to a calculation process or a storage process by the signal processing unit 170. Specifically, the signal processing unit 170 includes a calculation unit 171 and a storage unit 172. Based on the signals read from the imaging pixels 101, the calculation unit 171 generates a radiographic image and supplies the radiographic image to the control unit 180. Signals read from the detection pixels 104 and the correction pixels 107 are supplied to the signal processing unit 170 and subjected to a calculation process or a storage process by the calculation unit 171 of the signal processing unit 170.

Specifically, based on the signals read from the detection pixels 104 and the correction pixels 107, the signal processing unit 170 outputs information indicating emission of radiation to the radiographic imaging apparatus 100.

For example, the signal processing unit 170 detects the emission of radiation to the radiographic imaging apparatus 100 and determines the amount of emission and/or the integrated amount of emission of radiation.

Based on the information from the signal processing unit 170, the control unit 180 controls the driving circuit 150 and the reading circuit 160. Based on the information from the signal processing unit 170, the control unit 180 controls, for example, the start and the end of exposure (the accumulation of charges corresponding to emitted radiation in the imaging pixels 101).

The control unit 180 transmits control signals to the driving circuit 150 and the reading circuit 160, thereby executing a plurality of operations. For example, an operation for accumulating charges in each pixel is referred to as an accumulation operation. An operation for supplying a driving signal to the driving line 110, bringing the switch element of each pixel into a conducting state, and removing charges accumulated in the conversion element of the pixel is referred to as a reset operation.

An operation for supplying a signal to each pixel via the signal line 120 and reading charges accumulated in the pixels such as the imaging pixels 101, the detection pixels 104, and the correction pixels 107 is referred to as a reading operation. By the reading operation, signals for forming a radiographic image are read from the imaging pixels 101, and signals for monitoring the amount of emission of radiation are read from the detection pixels 104 and the correction pixels 107.

To determine the amount of emission of radiation, the control unit 180 controls the driving circuit 150 to scan only detection driving lines 111 so that only signals from the detection pixels 104 and the correction pixels 107 can be read. Then, the control unit 180 controls the reading circuit 160 to read signals of columns corresponding to the detection pixels 104 and the correction pixels 107 and output the signals as information indicating the amount of emission of radiation.

By repeating the above operations during the emission of radiation, the radiographic imaging apparatus 100 can obtain emission information in the detection pixels 104 during the emission of radiation. Thus, the radiographic imaging apparatus 100 can determine the amount of emission of radiation.

Figure 2:
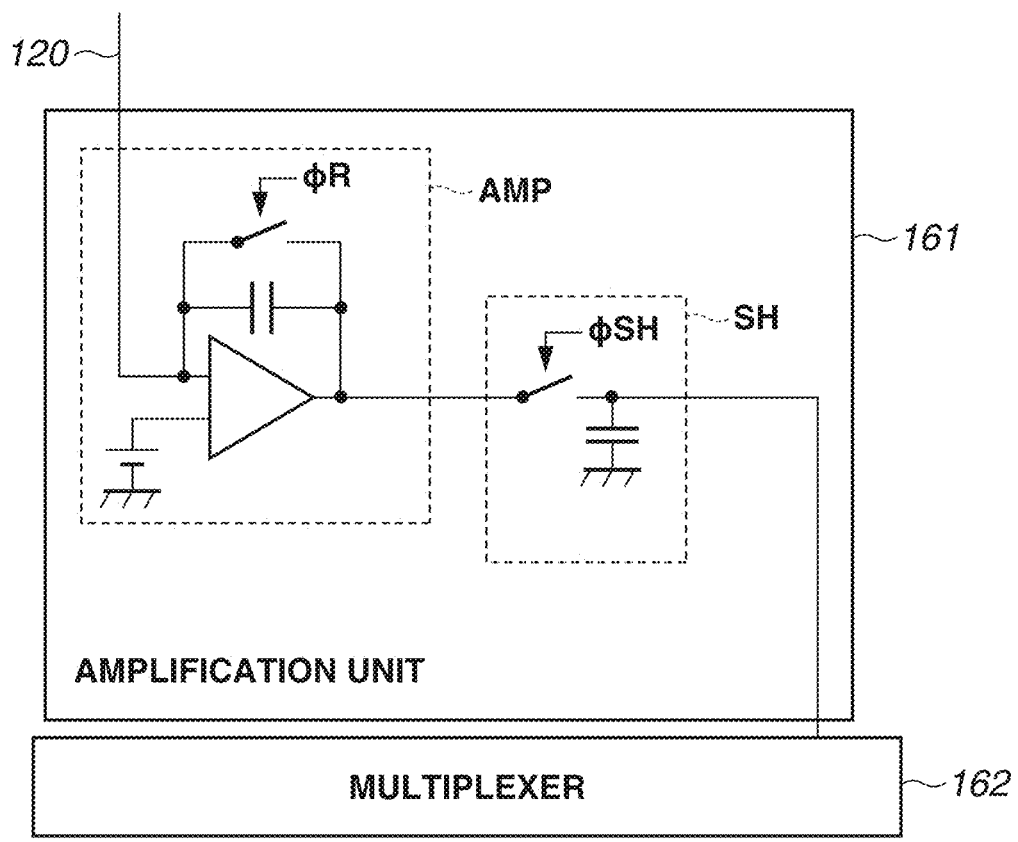
FIG. 2 is a diagram illustrating a configuration of an amplification unit according to the first exemplary embodiment of the disclosure.

FIG. 2 is a diagram illustrating an example of a detailed circuit configuration of the amplification unit 161. The amplification unit 161 includes a differential amplification circuit AMP and a sample hold circuit SH. The differential amplification circuit AMP amplifies a signal that appears in the signal line 120, and then outputs the amplified signal. The control unit 180 supplies a control signal φR to a switch element of the differential amplification circuit AMP and thereby can reset a potential of the signal line 120. An output from the differential amplification circuit AMP can be held in the sample hold circuit SH.

The control unit 180 supplies a control signal φSH to a switch element of the sample hold circuit SH, thereby causing the sample hold circuit SH to hold a signal. The signal held in the sample hold circuit SH is read by the multiplexer 162.

In the present exemplary embodiment, the differential amplification circuit AMP has three operation modes, namely a reading mode, a power saving mode 1, and a power saving mode 2, depending on differences in current supply capability of an output unit of a calculation amplifier.

The reading mode is a mode where the current supply capability of the output unit of the calculation amplifier is highest among the three operation modes, and is a mode for smoothly reading a signal by lowering impedance of the signal line 120. The power saving mode 1 is a mode where the current supply capability of the calculation amplifier is lowest among the three operation modes, and is a mode mainly selected during a standby state where neither the reading operation nor the reset operation is performed. The power saving mode 2 is a mode where the current supply capability of the calculation amplifier is approximately intermediate between those in the power saving mode 1 and the reading mode, and is a mode mainly selected during the reset operation.

By thus controlling the current supply capability of the calculation amplifier when the reading operation is not performed, it is possible to achieve power saving of entire imaging. The detailed settings of the operation mode of the amplification unit 161 will be described below.

Figure 3:
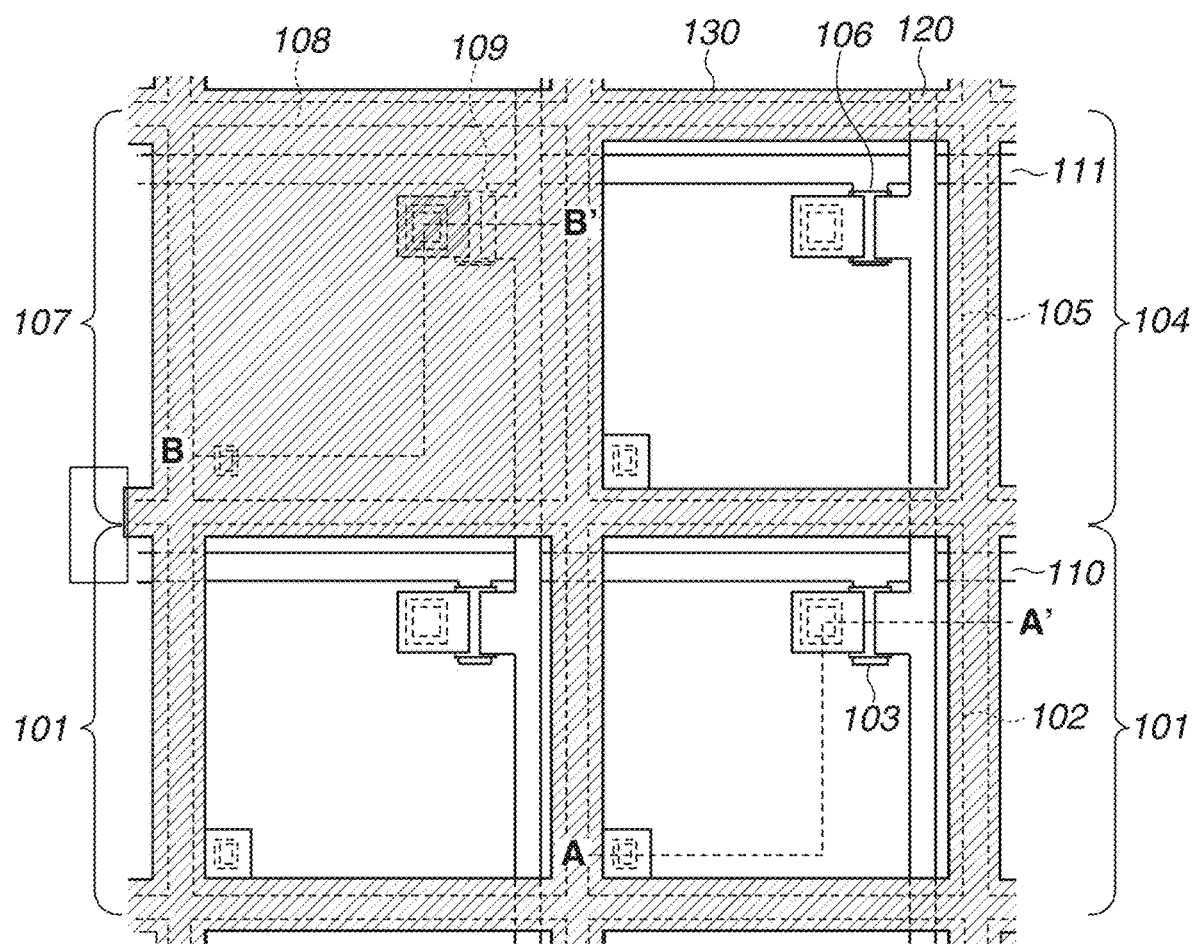
FIG. 3 is a plan view illustrating a configuration of a pixel according to the first exemplary embodiment of the disclosure.
Figure 4A:
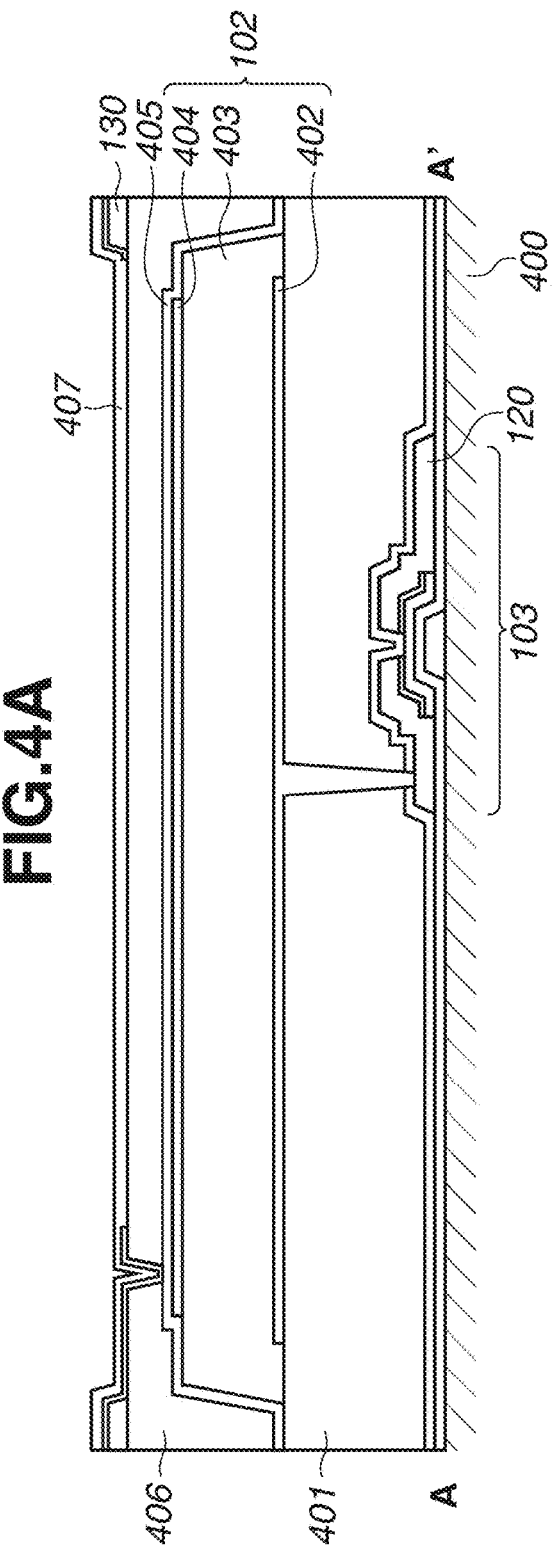
FIGS. 4A and 4B are cross-sectional views each illustrating a configuration of a pixel according to the first exemplary embodiment of the disclosure.
Figure 4B:
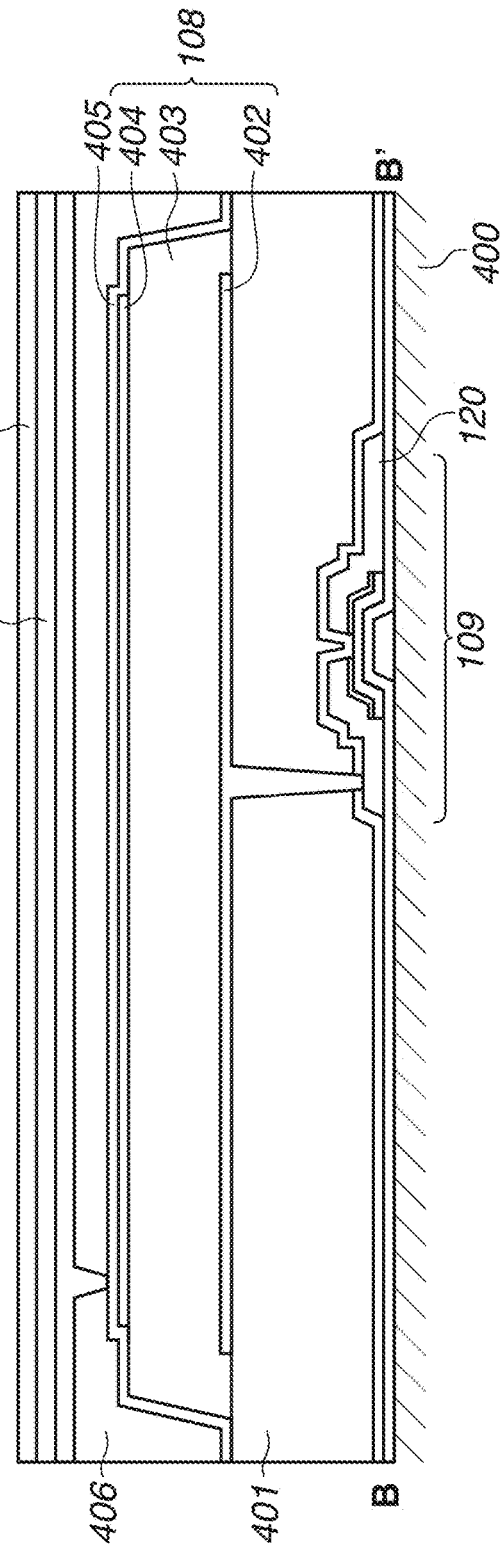

With reference to FIGS. 3, 4A, and 4B, examples of the structures of pixels of the radiographic imaging apparatus 100 are described.

FIG. 3 is a plan view illustrating the configurations of the imaging pixel 101, the detection pixel 104, and the correction pixel 107 of the radiographic imaging apparatus 100. The plan view is equivalent to orthographic projection onto a plane parallel to the imaging region IR of the radiographic imaging apparatus 100. As indicated by hatching, a metal layer is placed on the conversion element 108 of the correction pixel 107 and shields the conversion element 108 from light.

FIG. 4A is a cross-sectional view of the imaging pixel 101 along an A-A' line in FIG. 3. A cross-sectional view of the detection pixel 104 is similar to the cross-sectional view of the imaging pixel 101. On a supporting substrate 400 having insulation properties, such as a glass substrate, the switch element 103 is placed. The switch element 103 may be a TFT. On the switch element 103, an interlayer insulating layer 401 is placed. On the interlayer insulating layer 401, the conversion element 102 is placed.

The conversion element 102 is a photoelectric conversion element capable of converting an electric signal into light. For example, the conversion element 102 includes an electrode 402, a PIN photodiode 403, and an electrode 404. The conversion element 102 may be composed of a metal-insulator-semiconductor (MIS) sensor instead of the PIN photodiode.

On the conversion element 102, a protective film 405, an interlayer insulating layer 406, the bias line 130, and a protective film 407 are placed in order. On the protective film 407, a planarization film (not illustrated) and a scintillator (not illustrated) are placed. The electrode 404 is connected to the bias line 130 via a contact hole. As the material of the electrode 404, indium tin oxide (ITO) having light transmission properties is used, and the electrode 404 can transmit light converted from radiation by the scintillator (not illustrated).

FIG. 4B is a cross-sectional view of the correction pixel 107 along a B-B' line in FIG. 3. The correction pixel 107 may be similar to the imaging pixel 101 and the detection pixel 104 except that the conversion element 108 is covered with a light-blocking member 408. For example, the light-blocking member 408 is formed of a metal layer on the same layer as the bias line 130. Since the conversion element 108 of the correction pixel 107 is covered with the light-blocking member 408, the sensitivity of the correction pixel 107 to radiation is significantly lower than the sensitivities of the imaging pixel 101 and the detection pixel 104. It can also be said that charges accumulated in the conversion element 108 of the correction pixel 107 are not caused by radiation.

Figure 5:
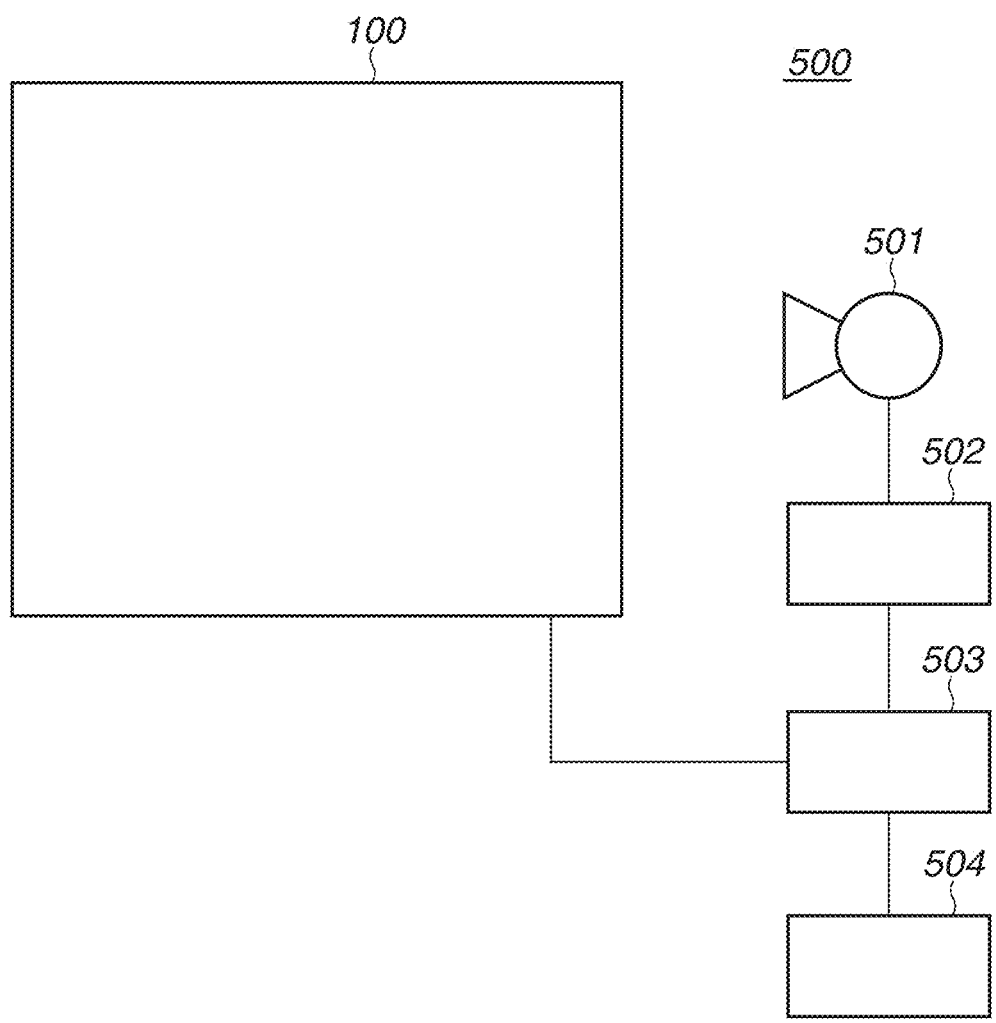
FIG. 5 is a diagram illustrating an example of a configuration of a radiographic imaging system including the radiographic imaging apparatus according to the disclosure.

FIG. 5 illustrates an example of a configuration of a radiographic imaging system 500 including the radiographic imaging apparatus 100. The radiographic imaging system 500 includes the radiographic imaging apparatus 100, a radiation source 501, a radiation source interface 502, a communication interface 503, and a controller 504.

To the controller 504, a dose, an emission upper limit time (ms), a tube current (mA), a tube voltage (kV), and a region of interest (ROI) as a region where radiation is to be monitored are input. If an exposure switch attached to the radiation source 501 is operated, the controller 504 transmits a start request signal to the radiographic imaging apparatus 100.

The start request signal is a signal requesting the start of the emission of radiation. In response to the reception of the start request signal, the radiographic imaging apparatus 100 starts preparation for receiving the emission of radiation. If the preparation is completed, the radiographic imaging apparatus 100 transmits a start-possible signal to the radiation source interface 502 via the communication interface 503. The start-possible signal is a signal notifying that the emission of radiation can be started. In response to the reception of the start-possible signal, the radiation source interface 502 causes the radiation source 501 to start emitting radiation.

If emitted radiation reaches a threshold for the integrated value of the dose, the radiographic imaging apparatus 100 transmits an end request signal to the radiation source interface 502 via the communication interface 503. The end request signal is a signal requesting the end of the emission of radiation.

In response to the reception of the end request signal, the radiation source interface 502 causes the radiation source 501 to end the emission of radiation. The threshold for the dose is determined by the control unit 180 based on an input value of the dose, emission intensity of radiation, and communication delay and processing delay between units. In a case where the emission time of radiation reaches the input emission upper limit time, the radiation source 501 stops emitting radiation even if the end request signal is not received.

After the emission of radiation is stopped, the radiographic imaging apparatus 100 sequentially scans driving lines 110 to which only the imaging pixels 101 are connected (the driving lines 110 other than detection driving lines 111), and reads image signals of the imaging pixels 101 using the reading circuit 160, thereby acquiring a radiographic image.

Charges accumulated in the detection pixels 104 are read during the emission of radiation, and the correction pixels 107 are shielded from light. Thus, signals from these pixels cannot be used to form the radiographic image.

Thus, the signal processing unit 170 of the radiographic imaging apparatus 100 performs an interpolation process using pixel values of imaging pixels 101 near the detection pixels 104 and the correction pixels 107, thereby interpolating pixel values at the positions of these pixels.

Figure 6:
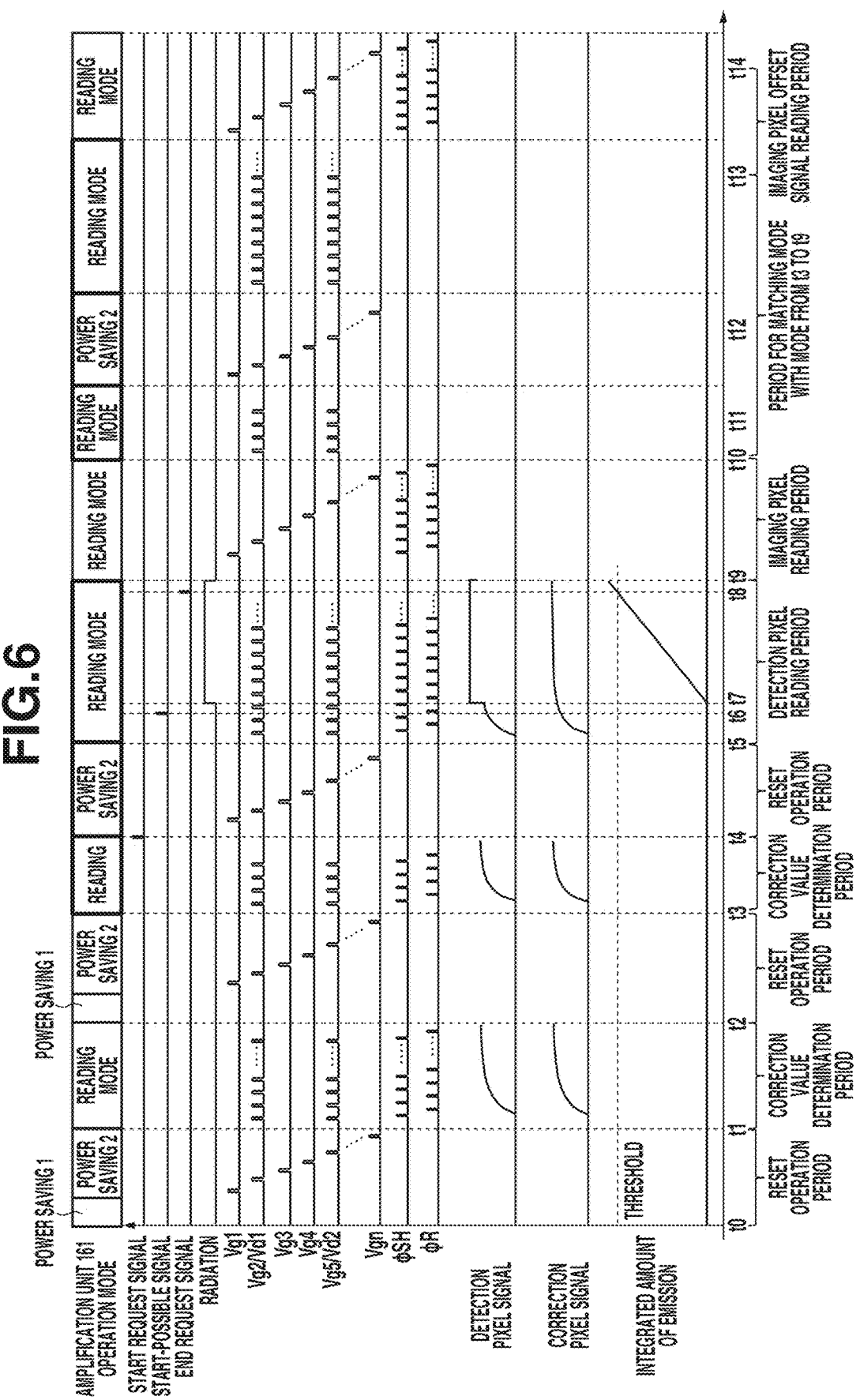
FIG. 6 is a diagram illustrating an operation of the radiographic imaging apparatus according to the first exemplary embodiment of the disclosure.

With reference to FIG. 6, an example of the operation of the radiographic imaging apparatus 100 is described.

In FIG. 6, "RADIATION" indicates whether radiation is emitted to the radiographic imaging apparatus 100. If "RADIATION" is low, radiation is not emitted. If "RADIATION" is high, radiation is emitted. In FIG. 6, "Vg1" to "Vgn" represent driving signals supplied from the driving circuit 150 to the plurality of driving lines 110. Here, "Vgk" corresponds to the driving line 110 in a k-th row (k=1, . . . , the total number of driving lines).

As described above, some of the plurality of driving lines 110 are referred to as the detection driving lines 111. In FIG. 6, "Vdj" represents a j-th detection driving line 111 (j=1, . . . , the total number of detection driving lines), φSH represents the level of a control signal supplied to the sample hold circuit SH of the amplification unit 161, and φR represents the level of a control signal supplied to the differential amplification circuit AMP of the amplification unit 161.

In FIG. 6, "DETECTION PIXEL SIGNAL" indicates the value of a signal read from the detection pixel 104, "CORRECTION PIXEL SIGNAL" indicates the value of a signal read from the correction pixel 107, and "INTEGRATED AMOUNT OF EMISSION" indicates the integrated value of radiation emitted to the radiographic imaging apparatus 100. A method for determining the integrated value will be described below.

The relationships among operations performed from a time t0 to a time t14 in FIG. 6 and first to fifth operations according to the disclosure are as follows. Operations performed from the time t5 to the time t9 correspond to the first operation according to the disclosure.

Similarly, operations performed from the time t12 to the time t14 correspond to the second operation, operations performed from the time t3 to the time t5 correspond to the third operation, operations performed from the time t10 to the time t12 correspond to the fourth operation, and operations performed from the time t0 to the time t3 correspond to the fifth operation. The details of the operations are described below chronologically in order from the time t0.

At the time t0, the control unit 180 starts a reset operation on a plurality of pixels. By the reset operation, the control unit 180 resets the pixels connected to the driving line 110 in the first row. Next, the control unit 180 resets the pixels connected to the driving line 110 in the second row. The control unit 180 repeats the reset operation up to the driving line 110 in the last row. At this time, to save power, the amplification unit 161 is set to the power saving mode 1 ("POWER SAVING 1" in FIG. 6) during a standby period until the reset operation is started. Then, the amplification unit 161 is set to the power saving mode 2 ("POWER SAVING 2" in FIG. 6) during the reset operation.

At the time t1, by a reading operation for reading signals from the detection pixel 104 and the correction pixel 107, the control unit 180 reads signals one or more times and determines correction values. The correction values are described in detail.

To determine the correction values, the control unit 180 performs the reading operation a predetermined number of times that is one or more times. The signal processing unit 170 determines a correction value Od based on a signal read from the detection pixel 104 by the reading operation performed the predetermined number of times, and a correction value Oc based on a signal read from the correction pixel 107 by the reading operation performed the predetermined number of times.

The determination of the correction values Oc and Od is described in detail. If the predetermined number of times is once, a single signal is read from the detection pixel 104. Thus, the signal processing unit 170 sets the value of the read signal as the correction value Od. If the predetermined number of times is multiple times, the signal processing unit 170 sets the average value of a plurality of read signals as the correction value Od. Instead of the average value, another statistical value may be used.

Based on the signal read from the correction pixel 107, the correction value Oc is also similarly determined.

The signal processing unit 170 stores the thus determined correction values Oc and Od in the storage unit 172 so that the correction values Oc and Od can be used in subsequent processing. At this time, the reading operation for determining the correction values Oc and Od is performed, for example, about several thousands of times, and the correction values Oc and Od are averaged, thereby an influence of noise of the correction values Oc and Od is reduced. This can improve the accuracy of correction. During the reading operation, the operation mode of the amplification unit 161 is set to the reading mode.

After performing the reading operation the predetermined number of times, then at the time t2, the control unit 180 repeats the reset operation again. Similarly to the above, the operation mode of the amplification unit 161 at this time is set to the power saving mode 1 during a standby state until the reset operation is started. Then, the operation mode of the amplification unit 161 is set to the power saving mode 2 during the reset operation.

At the time t3, by the reading operation for reading signals from the detection pixel 104 and the correction pixel 107 again, the control unit 180 reads signals one or more times and determines the correction values Oc and Od. A series of operations regarding the detection pixel 104 and the correction pixel 107 from the reading operation to the determination of the correction values Oc and Od is referred to as an acquisition operation. At this time, the operation mode of the amplification unit 161 is set to the reading mode. To respond to a change in the environment such as temperature, the correction values Oc and Od are periodically updated. For example, the correction values Oc and Od are updated in cycles of about several minutes to several tens of minutes. This facilitates responding to a change in the environment.

During the execution of the reading operation, if a start request signal for requesting the start of the emission of radiation is received at the time t4, the control unit 180 transitions from the reading operation for reading signals from the detection pixel 104 and the correction pixel 107 to the reset operation.

After the reset operation is performed up to the last row (at this time, the amplification unit 161 is set to the power saving mode 2), then at the time t5, the control unit 180 transitions to an operation for determining the amount of radiation that is being emitted to the radiographic imaging apparatus 100. During the operation, the amplification unit 161 is set to the reading mode. During this period, the control unit 180 temporarily supplies driving signals to one or more detection driving lines 111, thereby repeatedly executing the operation for reading signals from the detection pixel 104 and the correction pixel 107.

Then, the control unit 180 temporarily sets the control signal φSH to a high level, thereby holding, in the sample hold circuit SH, a signal read from a pixel to the reading circuit 160 via the signal line 120. Then, the control unit 180 temporarily sets the control signal φR to a high level, thereby resetting the reading circuit 160 (specifically, the differential amplification circuit AMP of the amplification unit 161 of the reading circuit 160). In a case where a region of interest is set in the imaging region IR, a signal does not need to be read from the detection pixel 104 outside the region of interest.

If the operation for reading signals from the detection pixel 104 and the correction pixel 107 is completed one or more times, then at the time t6, the control unit 180 transmits, to the radiation source interface 502, a start-possible signal indicating that the emission of radiation can be performed.

Every time the reading operation is performed, the signal processing unit 170 measures an amount of emission DOSE of radiation and determines whether the integrated value of the amount of emission DOSE exceeds a threshold. After the time t6, at the time t7, the emission of radiation is started. During the emission, an accumulation operation is performed on the imaging pixel 101, signals from the detection pixel 104 and the correction pixel 107 are acquired by the reading operation in parallel with the accumulation operation, and the amount of emission DOSE is determined.

A method for determining the amount of emission DOSE is described below. Sd represents the value of a signal read from the detection pixel 104 by the most recent reading operation. Sc represents the value of a signal read from the correction pixel 107 by the most recent reading operation. The signal processing unit 170 applies Sd, Sc, Od, and Oc to the following formula (1), thereby calculating DOSE.

$$\text{DOSE} = (Sd - Od) - (Sc - Oc) \qquad (1)$$

In this formula, the amount of emission DOSE is determined based on a difference between the value Sc of a signal read from the correction pixel 107 after the start-possible signal is transmitted and the correction value Oc determined based on a signal read from the correction pixel 107 before the start-possible signal is transmitted.

Alternatively, the signal processing unit 170 may apply Sd, Sc, Od, and Oc to the following formula (2) instead of the formula (1), thereby calculating DOSE.

$$\text{DOSE} = Sd - Od \times Sc/Oc \qquad (2)$$

In the formula (2), the amount of emission DOSE is determined based on a ratio between the value Sc of the signal read from the correction pixel 107 after the start-possible signal is transmitted and the correction value Oc determined based on the signal read from the correction pixel 107 before the start-possible signal is transmitted.

In the present exemplary embodiment, the amount of emission DOSE is determined by further using the values (Sc and Oc) of signals read from the correction pixel 107. Since the sensitivity of the correction pixel 107 to radiation is very low, the value Sc of the signal read from the correction pixel 107 after the emission of radiation is started can be regarded as representing an offset component of the value Sd of the signal read from the detection pixel 104.

Further, in the present exemplary embodiment, the amount of emission DOSE is determined using the correction values Oc and Od based on the signals read from the detection pixel 104 and the correction pixel 107 before the emission of radiation is started. This can correct differences between characteristics specific to pixels (a difference between channels of detection circuits, a difference in parasitic resistance between pixels, and a difference in parasitic capacitance between pixels).

If the integrated amount of emission reaches the threshold at the time t8, the control unit 180 transmits the end request signal to the radiation source interface 502. Alternatively, the control unit 180 may estimate the time at which the integrated amount of emission reaches the threshold, and transmit the end request signal at the estimated time.

At the time t9, in response to the reception of the end request signal, the radiation source interface 502 causes the radiation source 501 to end the emission of radiation. After the emission is ended, the radiation source interface 502 sequentially applies the driving signals Vg1 to Vgn that are high level signals and reads the imaging pixels 101. At this time, the operation mode of the amplification unit 161 is set to the reading mode.

From the time t10 to the time t13, the same driving method as that from the time t3 to the time t9 is executed. However, the signals are not read, and thus, the control signals φSH and φR are fixed to the low level. At this time, the operation mode of the amplification unit 161 is set to be similar to that from the time t3 to the time t9. Since the current supply capability of the calculation amplifier differs in each operation mode of the amplification unit 161, the potential state of the signal line 120 differs with respect to each operation mode. If the potential state differs between when signals for an image are acquired and when signals for an offset image are acquired, this causes an artifact when the correction is made.

Thus, the operation modes of the amplification unit 161 are matched to each other, whereby it is possible to match the potential state of the signal line 120 at the time t13 (when the reading of signals for an offset image is started) to the potential state of the signal line 120 at the time t9 (when the reading of signals for an image is started). The potential states are matched to each other, thereby the accuracy of correction can be improved. This reduces an image artifact.

If the start request signal for requesting the start of the emission of radiation is received during the execution of the reset operation (from the time t2 to the time t3), in one embodiment, the amplification unit 161 is set to the power saving mode 1 from the time t10 to the time t11. No matter what, it is important to match the operation mode of the amplification unit 161 from the time t10 to the time t11 to the operation mode of the amplification unit 161 when the start request signal for requesting the start of the emission of radiation is received.

At the time t13, the radiation source interface 502 sequentially applies the driving signals Vg1 to Vgn that are high level signals and reads signals for an offset image of the imaging pixels 101. If the signals of the imaging pixels 101 obtained from the time t9 to the time t10 are corrected using the signals obtained at this time, it is possible to obtain a high-grade image. From when the radiographic imaging apparatus 100 is powered on to when the first acquisition of the correction values Oc and Od is completed, in one embodiment, the correction values Oc and Od are acquired without permitting the emission of radiation even if the start request signal for requesting the start of the emission of radiation is received. As described above, the correction values Oc and Od are likely to be influenced by a change in the environment such as temperature. Thus, in one embodiment, the latest correction values Oc and Od are used.

With reference to FIGS. 7 to 10, a positional relationship among detection pixels 104 and correction pixels 107 are described. In FIGS. 7 to 10, to clarify positions of the detection pixels 104 and the correction pixels 107, the imaging pixels 101 are omitted. In these examples, regions of interests ROI_A to ROI_E are set in parts of the imaging region IR.

The region of interest is a region monitored by automatic exposure control (AEC), and the detection pixels 104 are placed in each region of interest. The amount of fluctuation in (or the fluctuation rate of) an offset component is mainly determined based on an operation method and an operation time for switching from the reset operation to the reading operation, and the positional relationship among the detection pixels 104 and the correction pixels 107 contributes little to the amount of fluctuation in the offset component. Thus, the number of correction pixels 107 may be smaller than the number of detection pixels 104.

For example, the single correction pixel 107 may be placed for several to several tens of detection pixels 104. Further, Sd, Sc, Od, and Oc acquired with respect to each signal line 120 may each be averaged over the plurality of signal lines 120. This can reduce noise.

Figure 7:
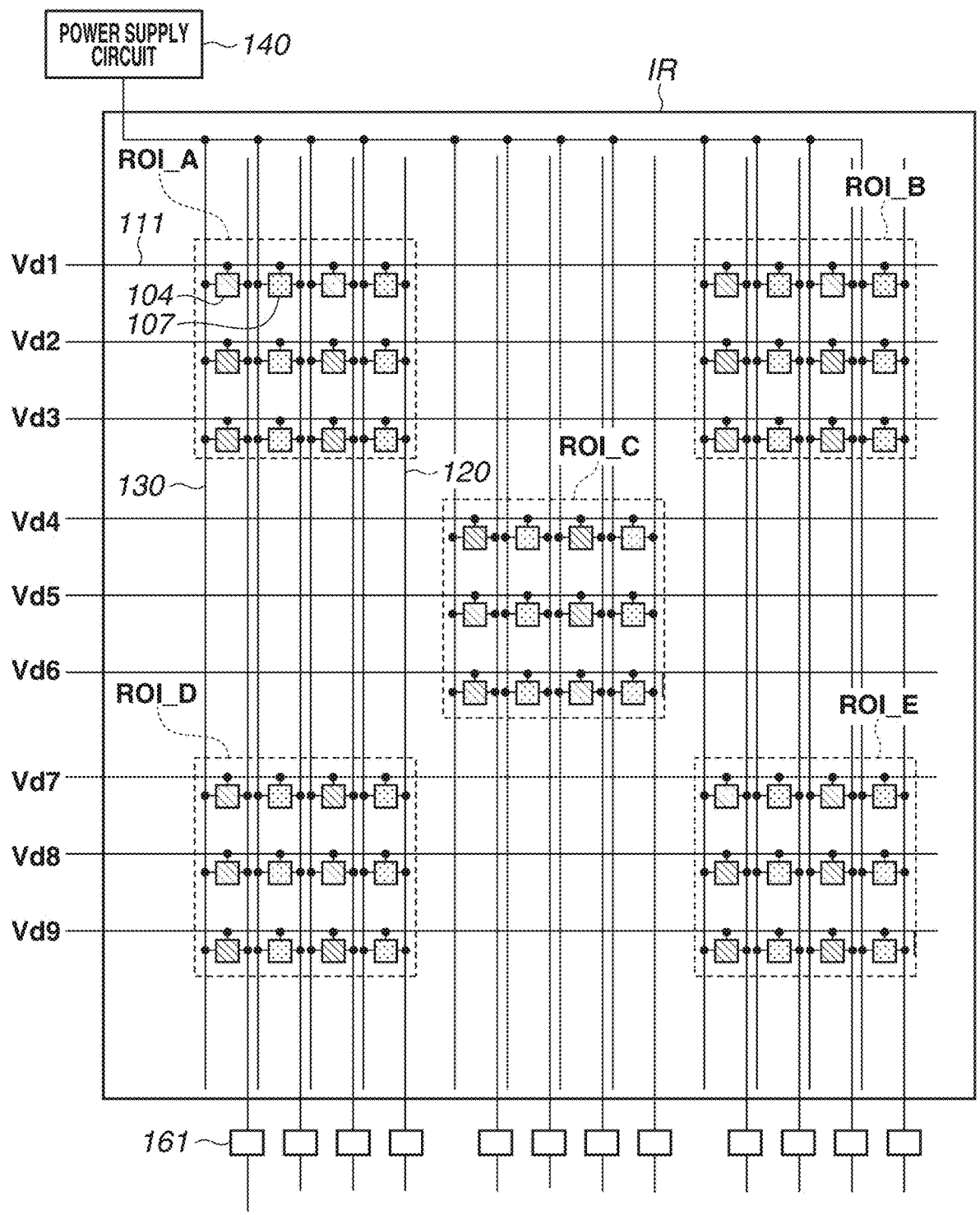
FIG. 7 is a diagram illustrating a positional relationship among detection pixels and correction pixels according to the first exemplary embodiment of the disclosure.
Figure 8:
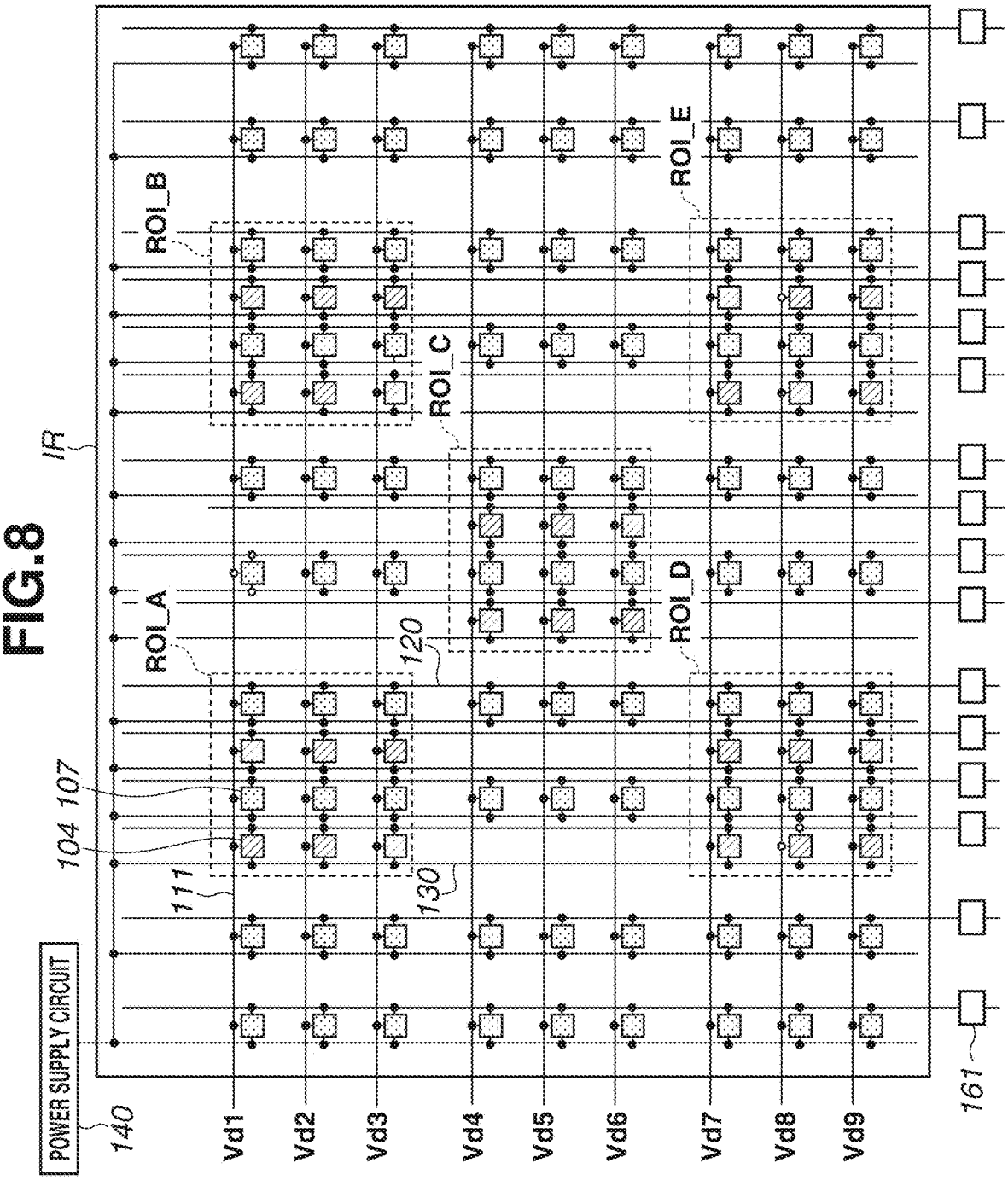
FIG. 8 is a diagram illustrating a positional relationship among the detection pixels and the correction pixels according to the first exemplary embodiment of the disclosure.

In the example of FIG. 7, the detection pixels 104 and the correction pixels 107 are placed only in the regions of interest ROI_A to ROI_E, and are not placed in other regions. In the example of FIG. 8, the detection pixels 104 are placed only in the regions of interest ROI_A to ROI_E, and are not placed in other regions. On the other hand, the correction pixels 107 are placed both in the regions of interest ROI_A to ROI_E and other regions.

Figure 9:
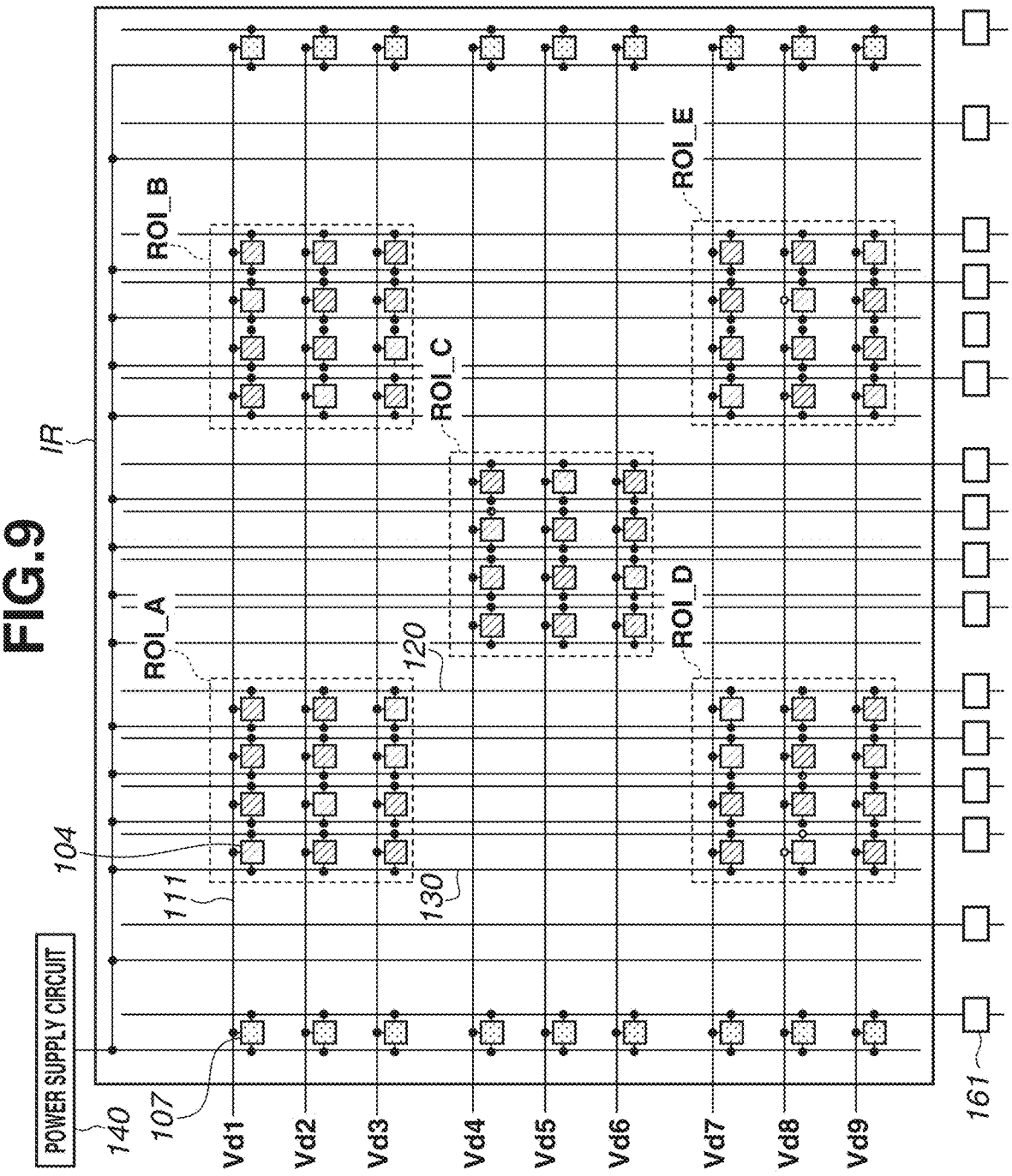
FIG. 9 is a diagram illustrating a positional relationship among the detection pixels and the correction pixels according to the first exemplary embodiment of the disclosure.

In the example of FIG. 9, the detection pixels 104 are placed only in the regions of interest ROI_A to ROI_E, and are not placed in other regions. On the other hand, the correction pixels 107 are not placed in the regions of interest ROI_A to ROI_E, and are placed in other regions. Such placement can increase the number of detection pixels 104 in the regions of interest. The correction pixels 107 are placed near edges of the imaging region IR.

The correction pixels 107 may be placed outside an effective pixel region, such as in the furthest edge portions. Since the sensitivity of the correction pixel 107 to radiation is low, the correction pixel 107 cannot be used to acquire an image signal. The correction pixels 107 are thus placed near the edges of the imaging region IR, whereby it is possible to reduce an influence of a missing portion of a radiographic image.

Figure 10:
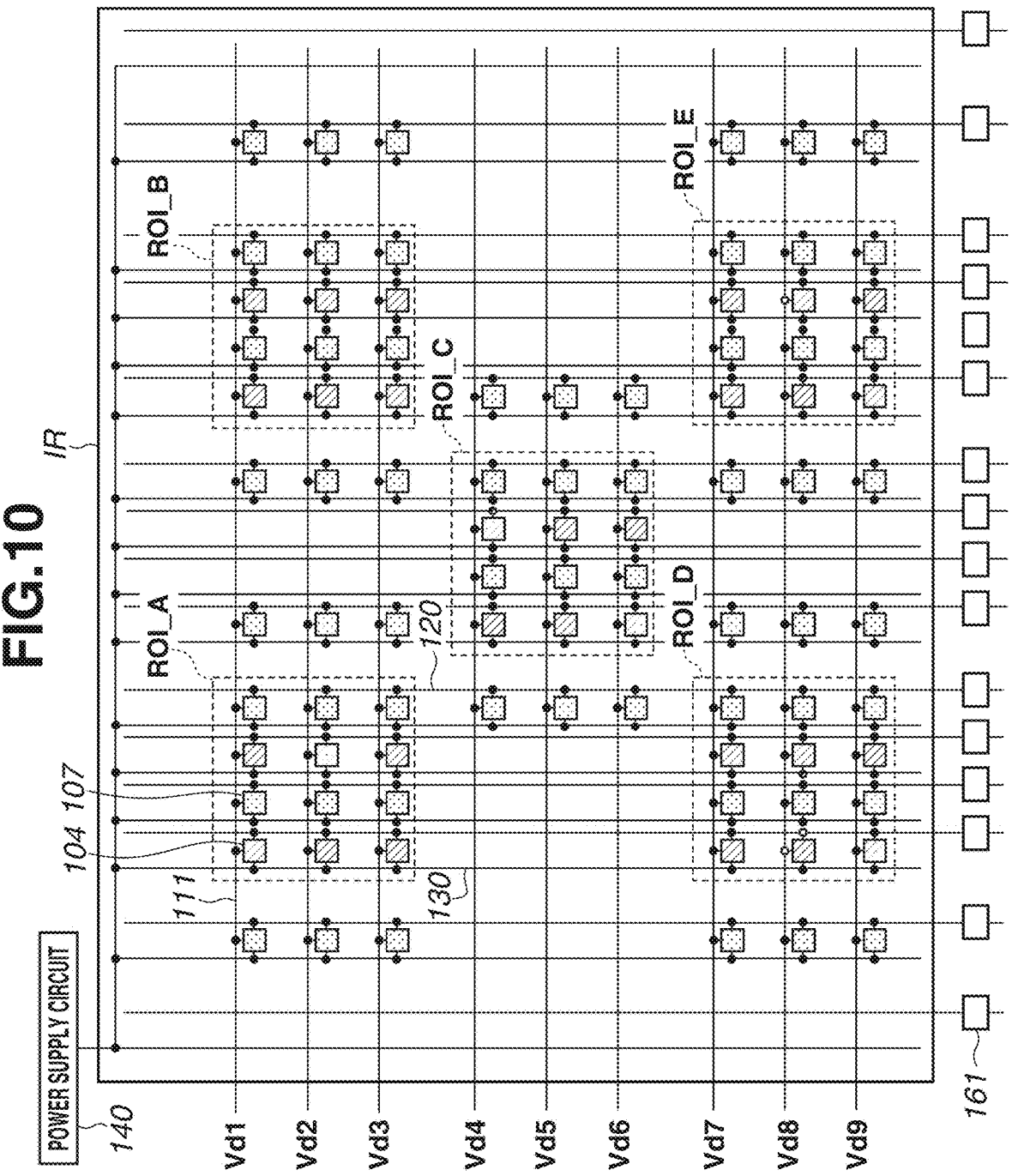
FIG. 10 is a diagram illustrating a positional relationship among the detection pixels and the correction pixels according to the first exemplary embodiment of the disclosure.

In the example of FIG. 10, the detection pixels 104 are placed only in the regions of interest ROI_A to ROI_E, and are not placed in other regions. On the other hand, the correction pixels 107 are placed in both the regions of interest ROI_A to ROI_E and other regions. Specifically, some of the correction pixels 107 are placed near each of the regions of interest ROI_A to ROI_E. The center of gravity of each region of interest and the center of gravity of a plurality of correction pixels 107 placed corresponding to the region of interest approximately match. Such placement can reduce an influence on offset correction due to a minute difference in resistance or capacitance between pixels, or a difference in the manner of transmission between driving signals transmitted through the detection driving line 111.

Figure 11:
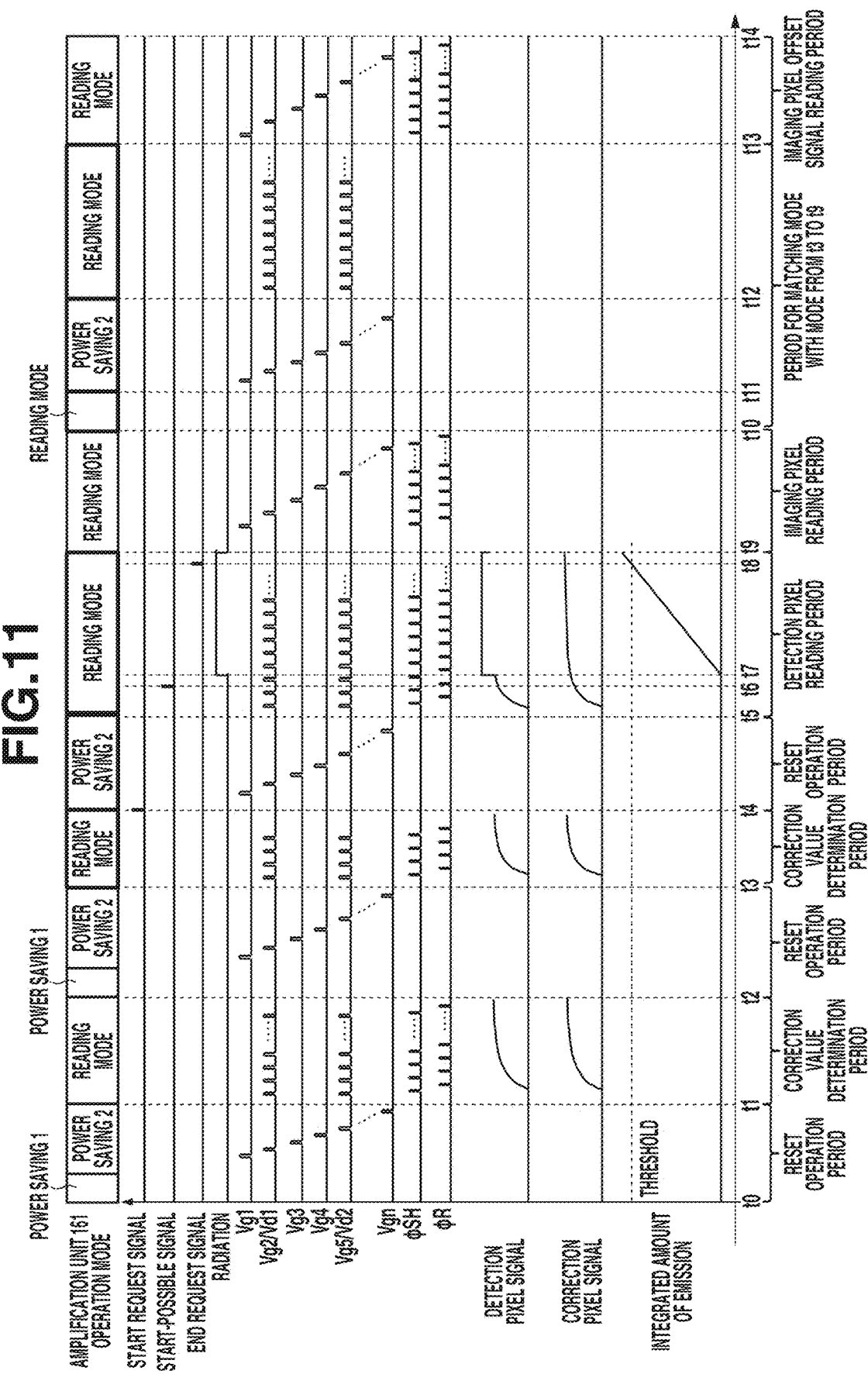
FIG. 11 is a diagram illustrating an operation of a radiographic imaging apparatus according to a second exemplary embodiment of the disclosure

Next, with reference to FIG. 11, a second exemplary embodiment of the disclosure is described. Portions redundant with the first exemplary embodiment are not described.

The second exemplary embodiment is different from the first exemplary embodiment in that in the period from the time t10 to the time t11, detection driving lines Vd1 and Vd2 are not driven and are in a standby state. In the disclosure, it is important to match the potential state of the signal line 120 at the time t13 to the potential state of the signal line 120 at the time t9. Thus, it is not necessary to drive the detection driving lines Vd1 and Vd2 from the time t10 to the time t11.

In the present exemplary embodiment, the period from the time t10 to the time t11 is shorter than the period from the time t3 to the time t4. As described above, in the disclosure, it is important that the potential state of the signal line 120 from the time t9 to the time t10 is the same as that thereof from the time t13 to the time t14. To save power, it is possible to shorten the period from the time t10 to the time t11 to the extent that makes an image artifact not an issue.

Figure 12:
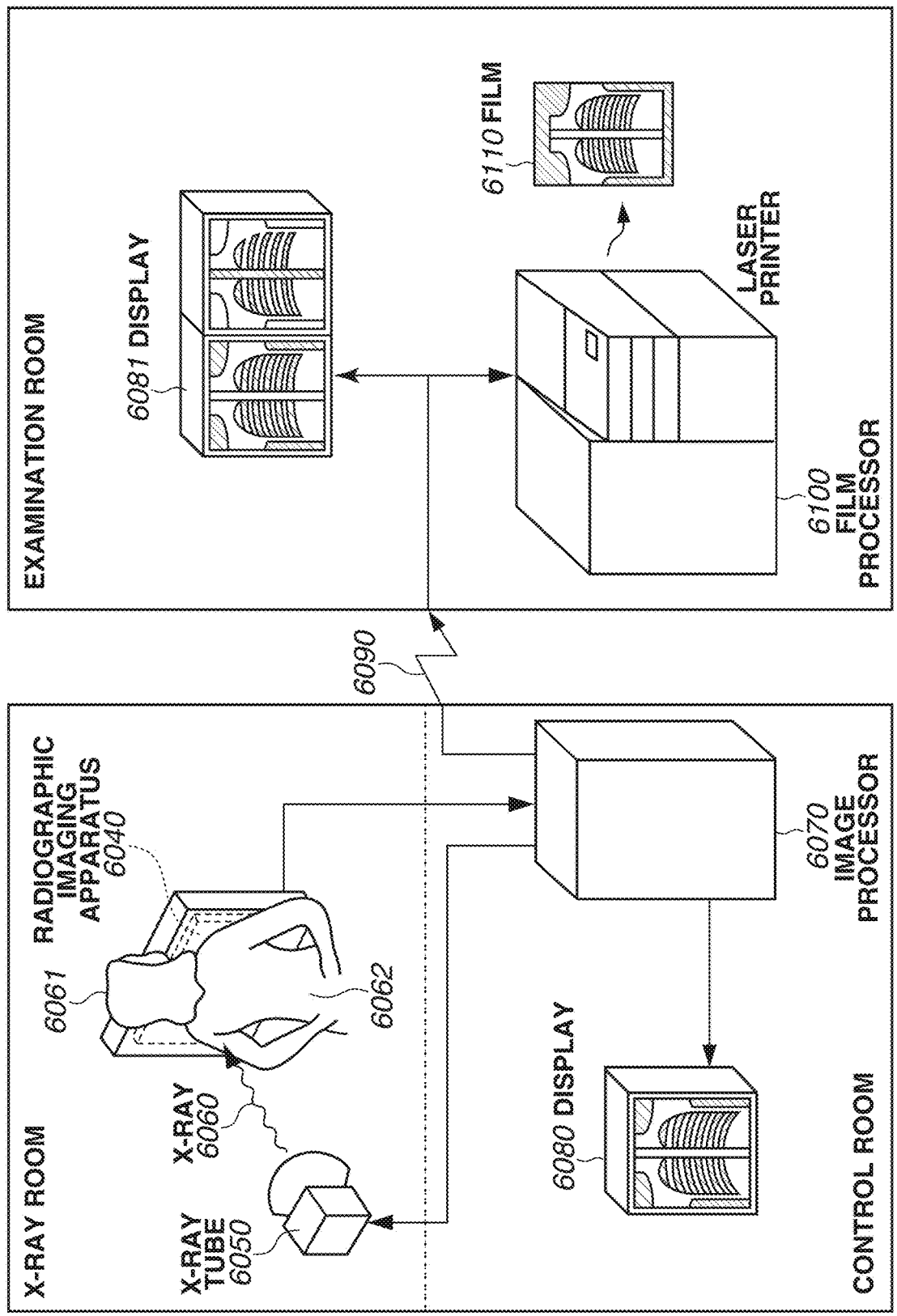
FIG. 12 is a diagram illustrating an operation of a radiographic imaging apparatus according to a third exemplary embodiment of the disclosure.

With reference to FIG. 12, a description is given below of an example where the radiographic imaging apparatus 100 is applied to a radiographic imaging system. An X-ray 6060 generated by an X-ray tube 6050 that is a radiation source passes through a chest 6062 of a patient or subject 6061 and is incident on a radiographic imaging apparatus 6040 typified by the radiographic imaging apparatus 100. The incident X-ray includes information regarding the inside of the body of the subject 6061.

In response to the incidence of the X-ray, a scintillator emits light, and a photoelectric conversion element photoelectrically converts the light, thereby obtaining electrical information. The information is converted into digital information, the digital information is subjected to image processing by an image processor 6070 that is a signal processing unit, and the information can be observed on a display 6080 that is a display unit in a control room.

This information can be transferred to a remote location by a transmission processing unit such as a telephone line 6090, can be displayed on a display 6081 that is a display unit or saved in a recording unit such as an optical disc in an examination room at another place, and can also be diagnosed by a doctor at the remote location. The information can also be recorded in a film 6110 as a recording medium by a film processor 6100 that is a recording unit.

Even in a case where the request to start emitting radiation is received during the acquisition of offset signals of pixels for detecting radiation, it is possible to reduce an image artifact and improve the grade of an image.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-198286, filed Nov. 30, 2020, which is hereby incorporated by reference herein in its entirety.

What is claimed is:

1. An apparatus comprising:
a plurality of pixels including a detection pixel configured to perform a detection operation for detecting an amount of emission of emitted radiation, a correction pixel having a sensitivity to radiation lower than a sensitivity of the detection pixel to radiation and configured to correct the amount of emission in the detection operation, and an imaging pixel configured to acquire a radiographic image; and
an amplification unit including a calculation amplifier including a feedback circuit configured to amplify signals read from the plurality of pixels via a signal line, the calculation amplifier including an output unit having a current supply capability being variable,
wherein, in response to reception of an instruction, the apparatus performs the detection operation by reading charges from the detection pixel and the correction pixel in a state where radiation is emitted and performs an image acquisition operation for reading a charge based on radiation accumulated in the imaging pixel, and then, the apparatus performs an offset signal acquisition operation for reading a charge accumulated in the imaging pixel in a state where radiation is not emitted, and performs a correction value acquisition operation for acquiring a correction value to be used in the detection operation before performing the image acquisition operation, and
wherein, in a case where the apparatus receives the instruction during the correction value acquisition operation, the apparatus causes the amplification unit to operate between the image acquisition operation and the offset signal acquisition operation based on a current supply capability in the correction value acquisition operation.

2. The apparatus according to claim 1, further comprising a control unit configured to execute:
a first operation for performing a first reading operation for reading charges from the detection pixel and the correction pixel via the amplification unit to determine an amount of the radiation that is being emitted to the apparatus based on values of signals read from the detection pixel and the correction pixel among the plurality of pixels, performing an accumulation operation for accumulating a charge in the imaging pixel during the emission of the radiation, and performing a second reading operation for reading a charge from the imaging pixel to acquire a signal for forming an image based on the radiation, the second reading operation being performed after the first reading operation during the emission of the radiation ends;
a second operation for performing the first reading operation, the accumulation operation, and the second reading operation after the first operation without the emission of the radiation to acquire an offset image to be used in offset correction of the image;
a third operation for performing an acquisition operation for acquiring a first correction value based on a value of the detection pixel and a second correction value based on a value of the correction pixel for correcting the amount of the radiation, based on signals read by the first reading operation performed one or more times, the acquisition operation being performed together with the accumulation operation, and for performing a reset operation for resetting charges accumulated in the plurality of pixels, the third operation being performed before the first operation; and
a fourth operation for performing the first reading operation, the accumulation operation, and the reset operation between the first and second operations,
wherein, in a case where the control unit receives a signal for transitioning to the first operation during execution of the third operation, the control unit performs the fourth operation based on a current supply capability of the amplification unit in the third operation.

3. The apparatus according to claim 2, wherein, in a case where the control unit receives the signal for transitioning to the first operation during execution of the acquisition operation in the third operation, the control unit transitions to the reset operation.

4. The apparatus according to claim 2, wherein, from when the apparatus is powered on to when the first and second correction values are acquired for the first time, the control unit does not transition to the first operation.

5. The apparatus according to claim 2, wherein the control unit makes a period of the accumulation operation and the first reading operation in the fourth operation shorter than a period of the acquisition operation in the third operation.

6. The apparatus according to claim 2, wherein the control unit executes, before the third operation, a fifth operation for performing the acquisition operation and the reset operation.

7. The apparatus according to claim 6, wherein the control unit has a standby period where the control unit performs neither the acquisition operation nor the reset operation, between the acquisition operation and the reset operation in the fifth operation.

8. The apparatus according to claim 7, wherein, in a case where the control unit is executing the reset operation when the control unit receives the signal for transitioning to the first operation during the execution of the third operation, the control unit makes the current supply capability during a period where the accumulation operation in the fourth operation is performed equal to the current supply capability during the standby period.

9. The apparatus according to claim 7, wherein the control unit sets the current supply capability in descending order from the reading operation, the reset operation, and the standby period.

10. A system comprising:
the apparatus according to claim 1; and
a signal processing unit configured to process a signal from the apparatus.

11. A method for controlling an apparatus including a plurality of pixels including a detection pixel configured to perform a detection operation for detecting an amount of emission of emitted radiation, a correction pixel having a sensitivity to radiation lower than a sensitivity of the detection pixel to radiation and configured to correct the amount of emission in the detection operation, and an imaging pixel configured to acquire a radiographic image, and an amplification unit including a calculation amplifier including a feedback circuit configured to amplify signals read from the plurality of pixels via a signal line, the calculation amplifier including an output unit having a current supply capability being variable, the method comprising:

in response to reception of an instruction, performing the detection operation by reading charges from the detection pixel and the correction pixel in a state where radiation is emitted and performing an image acquisition operation for reading a charge based on radiation accumulated in the imaging pixel, and then, performing an offset signal acquisition operation for reading a charge accumulated in the imaging pixel in a state where radiation is not emitted, and performing a correction value acquisition operation for acquiring a correction value to be used in the detection operation before performing the image acquisition operation; and in a case where the instruction is received during the correction value acquisition operation, causing the amplification unit to operate between the image acquisition operation and the offset signal acquisition operation based on a current supply capability in the correction value acquisition operation.

12. The method according to claim 11, the method further comprising:

performing a first operation for performing a first reading operation for reading charges from the detection pixel and the correction pixel via the amplification unit to determine an amount of the radiation that is being emitted to the apparatus based on values of signals read from the detection pixel and the correction pixel among the plurality of pixels, performing an accumulation operation for accumulating a charge in the imaging pixel during the emission of the radiation, and performing a second reading operation for reading a charge from the imaging pixel to acquire a signal for forming an image based on the radiation, the second reading operation being performed after the first reading operation during the emission of the radiation ends;

performing a second operation for performing the first reading operation, the accumulation operation, and the second reading operation after the first operation without the emission of the radiation to acquire an offset image to be used in offset correction of the image;

performing a third operation for performing an acquisition operation for acquiring a first correction value based on a value of the detection pixel and a second correction value based on a value of the correction pixel for correcting the amount of the radiation, based on signals read by the first reading operation performed one or more times, the acquisition operation being performed together with the accumulation operation, and for performing a reset operation for resetting charges accumulated in the plurality of pixels, the third operation being performed before the first operation; and performing a fourth operation for performing the first reading operation, the accumulation operation, and the reset operation between the first and second operations, wherein, in a case where a signal for transitioning to the first operation is received during execution of the third operation, the fourth operation is performed based on a current supply capability of the amplification unit in the third operation.

13. The method according to claim 12, wherein, in a case where a control unit receives the signal for transitioning to the first operation during execution of the acquisition operation in the third operation, the control unit transitions to the reset operation.

14. The method according to claim 12, wherein, from when the apparatus is powered on to when the first and second correction values are acquired for the first time, a control unit does not transition to the first operation.

15. The method according to claim 12, wherein a control unit makes a period of the accumulation operation and the first reading operation in the fourth operation shorter than a period of the acquisition operation in the third operation.

16. The method according to claim 12, wherein a control unit executes, before the third operation, a fifth operation for performing the acquisition operation and the reset operation.

17. The method according to claim 16, wherein the control unit has a standby period where the control unit performs neither the acquisition operation nor the reset operation, between the acquisition operation and the reset operation in the fifth operation.

18. The method according to claim 17, wherein, in a case where the control unit is executing the reset operation when the control unit receives the signal for transitioning to the first operation during the execution of the third operation, the control unit makes the current supply capability during a period where the accumulation operation in the fourth operation is performed equal to the current supply capability during the standby period.

19. The method according to claim 17, wherein the control unit sets the current supply capability in descending order from the reading operation, the reset operation, and the standby period.

* * * * *